Jan. 6, 1942.                T. W. REILLY                2,269,224
                          METHOD OF WELDING
                         Filed Aug. 1, 1940
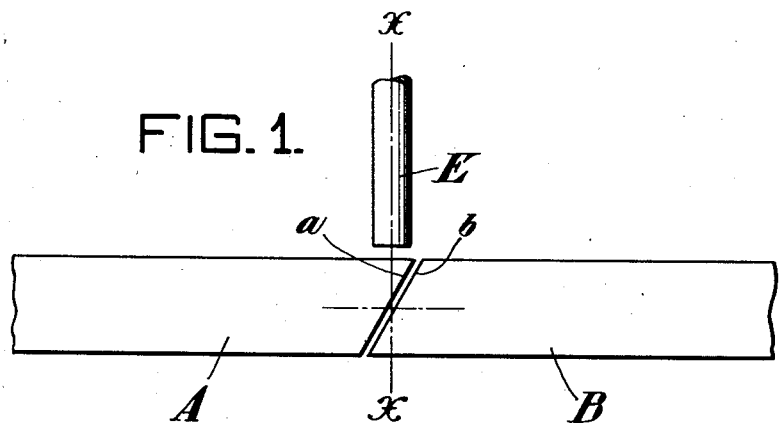
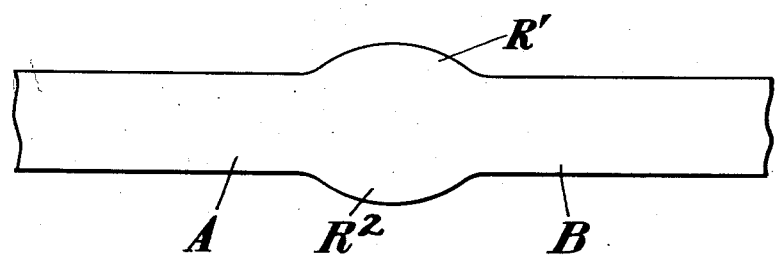
Inventor:
THOMAS W. REILLY,
by: John E. Jackson
          his Attorney.

Patented Jan. 6, 1942

2,269,224

UNITED STATES PATENT OFFICE 2,269,224

METHOD OF WELDING

Thomas W. Reilly, Elizabeth, N. J., assignor to Federal Shipbuilding and Dry Dock Company, a corporation of New Jersey Application August 1, 1940, Serial No. 349,358

2 Claims. (Cl. 219—10)

This invention relates to an improved method of welding, and aims to eliminate the expensive fitting or backing-up required in the methods heretofore generally used.

Heretofore, according to well-known conventional practice, the edges of plates to be welded are usually prepared by one of two methods. In the first conventional method, which relates to the welding of thicker plates, the opposed edges of the plates are oppositely beveled, forming between them a V-shaped groove to receive the metal deposited from the welding electrode. In the second conventional method, which was used generally on welding thinner plates, the square edges are butted together and the welding electrode applied along the seam between such abutted plates. In such prior methods, the groove or the butt joint must be carefully fitted together or backed up to prevent the molten weld metal from running through and escaping. In the prior methods referred to, the welding rod is generally propelled by a mechanical device. If the weld of metal does not penetrate from one face of the plates to be welded to the other, a manually-applied weld becomes necessary. The present invention cuts down the cost of fitting operations heretofore essential and eliminates the use of expensive backing-up devices heretofore required to prevent the running through of the weld metal.

The invention will be fully apparent from the following detailed description when read in connection with the accompanying drawing, in which Figure 1 is a sectional view through a pair of plates adapted to be butt welded and showing the relative position of the welding electrode and the overlapping portions of the plate to be welded in accordance with my improved method, and Figure 2 is a cross-section showing a welded joint resulting from the operation of the improved method.

In carrying out my method, I cut the abutting edges of the opposed plates A and B at an angle, so as to provide the beveled faces $a$ and $b$, and I place the plates in opposed relation to one another so as to provide what I term a beveled lap joint. There may be a slight clearance between the beveled faces $a$ and $b$, and practice has demonstrated that this clearance may be as much as $\frac{1}{16}$ of an inch without objectionably affecting the welding method. This is in contrast with prior methods, wherein a very close and accurate fit between the parts is required in order to prevent the weld metal from running through.

After the work-pieces to be welded are arranged so as to provide the beveled lap joint, the welding electrode is so positioned that its center line X—X passes substantially or approximately through the middle zone of the overlapping portions of the beveled lap joint. With the parts thus arranged prior to the welding operation, it is apparent that there is an overhanging of the metal on the right-hand side of the center line X—X, where the parts are beveled in the manner illustrated in the drawing. Obviously the parts could be oppositely beveled, if desired, and instead of the flat and beveled faces shown they could be concave or convex. Upon application of the welding current, the arc struck between the electrode E and the work gradually melts the overhanging portion, starts the weld and acts somewhat in the nature of a seal to prevent the metal from running through the space between the parts as the welding progresses. With the position of the electrode illustrated over the center of the overlap, the first intense heat upon striking the arc melts the upper corner of the bevel. This metal runs down in the restricted clearance space and unites under the welding influence with the somewhat cooler metal below, the relative coolness probably being due to the gradually increasing distance of the progressive welding union from the source of heat. This is believed to be the correct theory. However, actual operation of the method has demonstrated that when a weld is effected according to the method herein illustrated and described, the weld in a sense acts in the manner recited in the preceding sentences.

By way of example, the weld may be effected by traversing the welding electrode first along one face of the work. Thereupon the work may be inverted and the electrode traversed along the opposite face. However, in some cases it will be understood that a satisfactory weld can be obtained by traversing the welding electrode along only one face of the work, the important feature of the invention being the provision of the beveled lap which eliminates the expensive requirement of closely and accurately fitting the parts which are to be joined.

The beveled surface may be made either by machining the square edge or by burning off a corner of a perpendicularly sheared sheet so as to form the bevel. Burning is desirable in some cases, as it eliminates the necessity of removing corrosion by grinding. In practice, a 30-degree bevel has been found quite satisfactory, and a clearance of as much as $\frac{1}{16}$ inch between the opposed plates is permissible. Thus it is apparent that a generous working tolerance is provided for.

By utilization of the method described, one of the beveled plates (plate B in the case illustrated) serves as a backing-up medium and permits the use of high current values in the welding operation. This in turn permits the use of high current values on the second weld when the opposite face of the work is welded. Thus the method effects a weld with a better penetration and better interlocking of the two welds. This improved result is obtained in a shorter time than required by prior methods wherein the work-pieces have to be accurately fitted and butted together or backed up prior to the welding operation. In short, fitting operations prior to welding are reduced to a minimum, and a superior weld is secured in a shorter time because of the ability to use higher current values than those used in standard prior practice. The resulting welding reinforcement, as indicated at R' and R² in Figure 2, is wider and of more uniform appearance than the applied metal resulting from prior welding methods, and the welded joint has fewer imperfections resulting from the inclusion of foreign particles such as frequently occurs when using prior art welding methods.

I claim:

1. A method of welding which comprises forming the edges of the work-pieces to provide overlapping portions, juxtaposing the workpieces with an open space between them defined by the said formed edges, and traversing a welding electrode along a line located approximately midway between the overlapping portions of the pieces to be welded.

2. A method of welding which comprises beveling the work-pieces to be joined, arranging such beveled pieces in juxtaposition with a clearance space between them so that said beveled portions overlap, and traversing a welding electrode along a line substantially or approximately midway between said overlapping portions.

THOMAS W. REILLY.